US012791464B2

(12) United States Patent
Matsuguma et al.

(10) Patent No.: US 12,791,464 B2
(45) Date of Patent: Nov. 10, 2026

(54) SETTING DEVICE, COMPUTER-READABLE RECORDING MEDIUM THAT RECORDS PROGRAM, ENVIRONMENT FORMING DEVICE, AND SETTING METHOD

(71) Applicant: ESPEC CORP., Osaka (JP)

(72) Inventors: Osamu Matsuguma, Osaka (JP); Akiko Kadowaki, Osaka (JP); Takashi Okazawa, Osaka (JP); Yuuki Kado, Osaka (JP); Miyuki Ariga, Osaka (JP)

(73) Assignee: ESPEC CORP., Osaka (JP)

( * ) Notice: Subject to any disclaimer, the term of this patent is extended or adjusted under 35 U.S.C. 154(b) by 499 days.

(21) Appl. No.: 18/187,590

(22) Filed: Mar. 21, 2023

(65) Prior Publication Data

US 2023/0304919 A1 Sep. 28, 2023

(30) Foreign Application Priority Data

Mar. 24, 2022 (JP) ................................ 2022-048706

(51) Int. Cl.
*G01N 17/00* (2006.01)
*G01M 99/00* (2011.01)

(52) U.S. Cl.
CPC ........ *G01N 17/002* (2013.01); *G01M 99/002* (2013.01)

(58) Field of Classification Search
CPC .... G01N 17/002; G01N 17/02; G01M 99/002
See application file for complete search history.

(56) References Cited

U.S. PATENT DOCUMENTS 6,629,003 B1 * 9/2003 Frizzell ............ G05B 19/41865 700/83
2003/0023347 A1 1/2003 Konno et al.
2003/0169532 A1 * 9/2003 Takami .................. G11B 33/14 360/97.13
2013/0138379 A1 * 5/2013 Mahajan ............. G01K 15/007 702/99
2017/0278000 A1 9/2017 Kohlhepp
2019/0011352 A1 1/2019 Yoshida et al.
2021/0182101 A1 6/2021 Mizuno et al.
2023/0219223 A1 7/2023 Ogura et al.

FOREIGN PATENT DOCUMENTS

JP 2019-015585 A 1/2019
WO 2021/246416 A1 12/2021

OTHER PUBLICATIONS

The extended European search report issued by the European Patent Office on Jul. 28, 2023, which corresponds to European Patent Application No. 23163510.3-1205 and is related to U.S. Appl. No. 18/187,590.

* cited by examiner

*Primary Examiner* — Paul M. West

(74) *Attorney, Agent, or Firm* — Studebaker Brackett PLLC

(57) ABSTRACT

An information processing device acquires operation information by a user regarding setting of the operation control information, arrays and displays, independently for each type on a setting screen, a plurality of types of setting parts corresponding to a plurality of types of control setting items included in the operation control information based on the operation information having been acquired, and generates the operation control information based on the arrayed information, and outputs the operation control information having been generated.

12 Claims, 11 Drawing Sheets

SETTING DEVICE, COMPUTER-READABLE RECORDING MEDIUM THAT RECORDS PROGRAM, ENVIRONMENT FORMING DEVICE, AND SETTING METHOD

FIELD OF INVENTION

The present invention relates to a setting device, a computer-readable recording medium that records a program, an environment forming device, and a setting method.

BACKGROUND ART

A setting device according to the background art is disclosed in, for example, JP 2019-15585 A. The operator sets an environmental condition (temperature, humidity, or the like) related to each test step of program operation by inputting data to a setting screen displayed on a display unit of an operation terminal. The setting device sets operation control information for controlling program operation based on the environmental condition acquired from the operation terminal.

In the environment test device, there is a case where a plurality of environmental conditions are set for one test step. In this case, in a method of setting an environmental condition for each test step as in the setting device according to the background art, even in a case of changing a setting value of only one of the plurality of environmental conditions, it is necessary to divide the test step before and after the change. Therefore, since it is necessary to finely divide and set the test steps, the data input work by the operator becomes complicated due to the increase in the number of test steps, and the work efficiency decreases.

SUMMARY OF THE INVENTION

An object of the present invention is to provide a setting device, a computer-readable recording medium that records a program, an environment forming device, and a setting method that can improve work efficiency of data input work by an operator.

A setting device according to one aspect of the present invention is a setting device that sets operation control information for controlling operation of an environment forming device, the setting device including: an acquisition unit that acquires operation information by a user regarding setting of the operation control information; a processing unit that performs processing of arraying and displaying, independently for each type on a setting screen, a plurality of types of setting parts corresponding to a plurality of types of control setting items included in the operation control information based on the operation information acquired by the acquisition unit, and processing of generating the operation control information based on the arrayed information; and an output unit that outputs the operation control information generated by the processing unit.

DETAILED DESCRIPTION

Hereinafter, an embodiment of the present invention will be described in detail with reference to the drawings. Elements denoted by the same reference signs in different drawings represent the same or corresponding elements.

Figure 1:
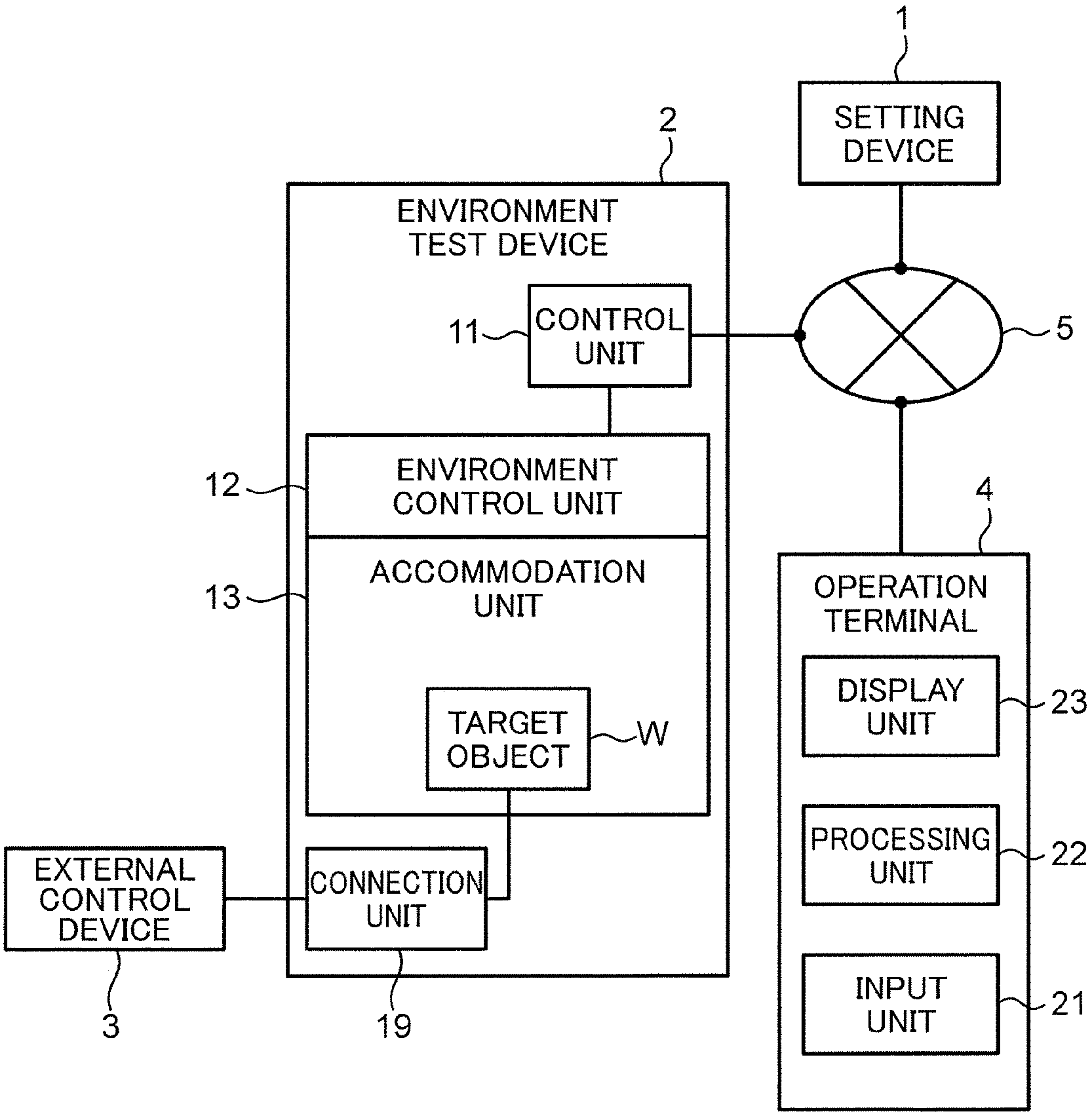
FIG. 1 is a view illustrating an overall configuration of an environment test system according to an embodiment of the present invention.

FIG. 1 is a view illustrating an overall configuration of an environment test system according to an embodiment of the present invention. As illustrated in FIG. 1, the environment test system includes a setting device 1, an environment test device 2, an external control device 3, an operation terminal 4, and a communication network 5.

The communication network 5 is an optional communication network such as the Internet or an intranet compatible with an optional communication system such as IP.

The setting device 1 is a server device or the like connected to the communication network 5.

The environment test device 2 is an example of an environment forming device, and is a temperature and humidity test device connected to the communication network 5 in the example of the present embodiment. The temperature and humidity test device evaluates the performance and the like of a target object W by applying temperature stress and humidity stress to the target object W. However, the environment forming device may be a heat treatment device or the like.

The environment test device 2 includes a control unit 11, an environment control unit 12, an accommodation unit 13, and a connection unit 19. The control unit 11 includes a processor such as a CPU. The environment control unit 12 includes a heating device, a cooling device, a humidification device, a dehumidification device, and the like. The accommodation unit 13 is a chamber surrounded by a thermal insulating housing, and the target object W is accommodated therein. The connection unit 19 includes a relay whose on and off are controlled by the control unit 11. The target object W is an electronic component such as a circuit board, for example. The connection unit 19 may be arranged between the environment test device 2 and the external control device 3.

The external control device 3 is a control device that externally controls the target object W, and is a power supply device for applying a current to the target object W in the example of the present embodiment. The external control device 3 is externally connected to the target object W via the relay included in the connection unit 19. The control unit 11 connects the external control device 3 and the target object W (that is, brings the external control device 3 and the target object W into a conductive state) by turning on the relay, and releases the connection between the external control device 3 and the target object W (that is, brings the external control device 3 and the target object W into an interrupt state) by turning off the relay.

The operation terminal 4 is a personal computer or the like connected to the communication network 5. The operation terminal 4 includes an input unit 21 such as a keyboard, a mouse, or a touchscreen, a processing unit 22 such as a CPU, and a display unit 23 using a display device such as a liquid crystal display.

Figure 2:
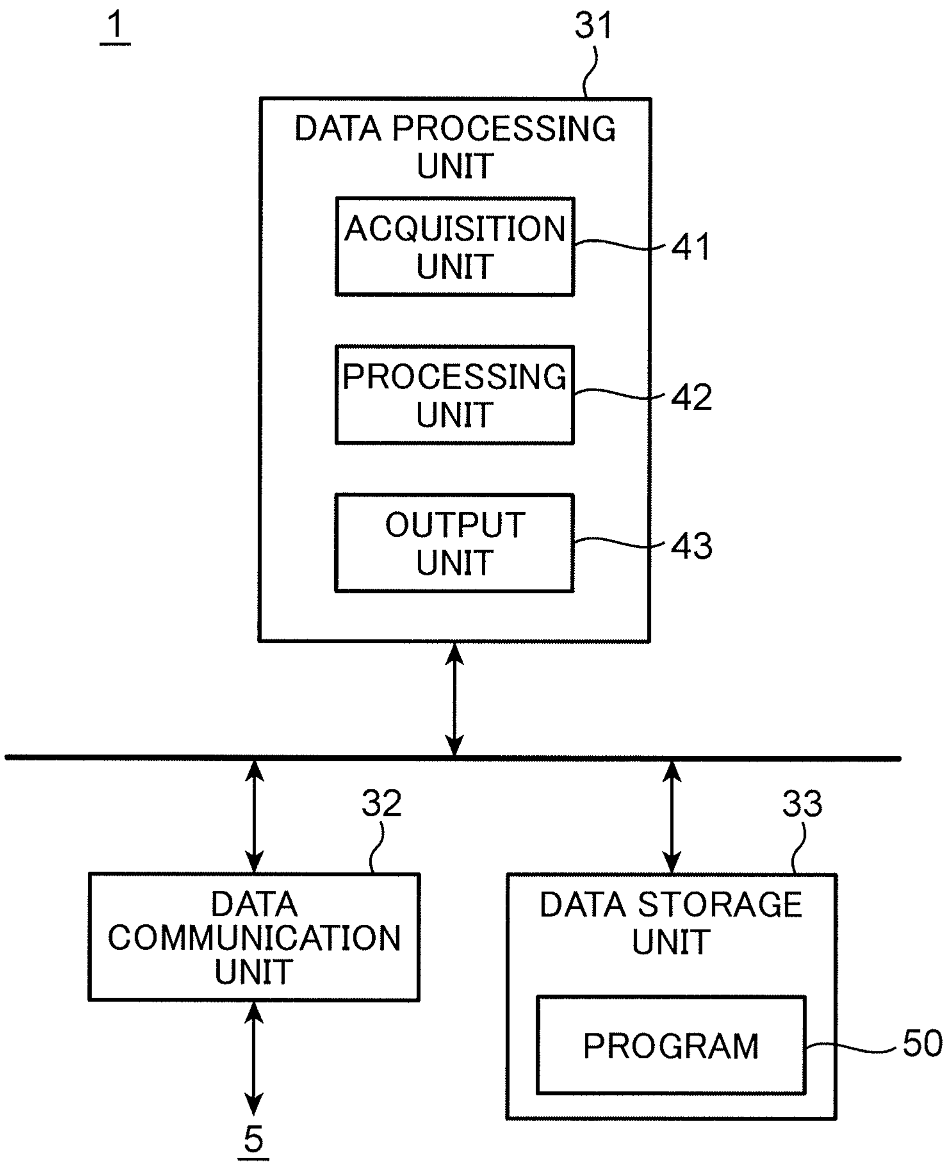
FIG. 2 is a view illustrating a configuration of a setting device.

FIG. 2 is a view illustrating the configuration of the setting device 1. As illustrated in FIG. 2, the setting device 1 includes a data processing unit 31, a data communication unit 32, and a data storage unit 33 that are connected to one another via a bus. The data processing unit 31 includes a processor (information processing device) such as a CPU. The data communication unit 32 includes a communication module compatible with a communication system of the communication network 5 such as IP. The data storage unit 33 includes an optional computer-readable storage medium such as an HDD, an SSD, or a semiconductor memory. The data storage unit 33 stores a program 50. The data processing unit 31 includes an acquisition unit 41, a processing unit 42, and an output unit 43 as functions implemented by the CPU executing the program 50 read from the data storage unit 33.

Figure 3:
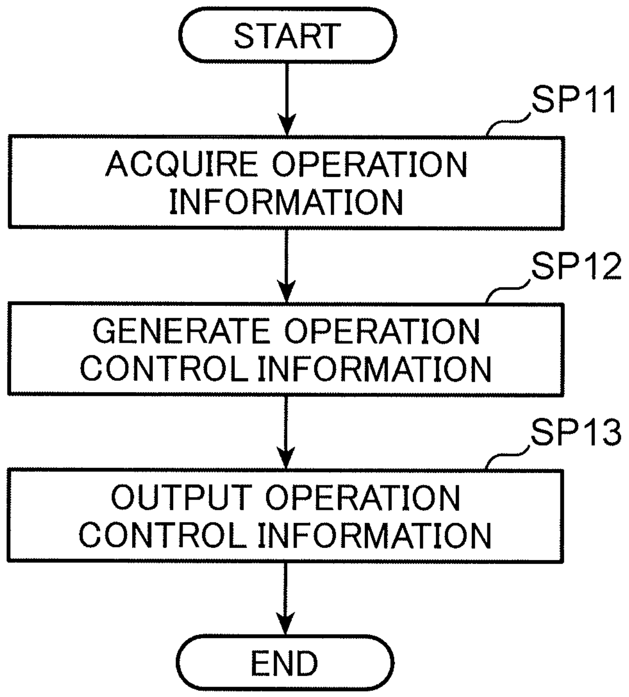
FIG. 3 is a flowchart presenting a flow of setting processing executed by a data processing unit.

FIG. 3 is a flowchart presenting the flow of setting processing executed by the data processing unit 31.

First, in step SP11, the acquisition unit 41 acquires operation information by a user such as an operator on a setting screen 60 (details described below) displayed on the display unit 23. The operator performs operation on the setting screen 60 by mouse operation of the input unit 21 or the like. Due to this, operation information indicating operation content by the operator is input to the operation terminal 4. The operation information is transmitted from the operation terminal 4 to the setting device 1 via the communication network 5. The acquisition unit 41 acquires, from the data communication unit 32, the operation information received from the operation terminal 4 by the data communication unit 32. The processing unit 42 performs editing processing of the setting screen 60 every time the acquisition unit 41 acquires the operation information. That is, the processing unit 42 performs display processing of arraying and displaying, independently for each type on the setting screen 60, a plurality of types of piece figures (setting parts) corresponding to a plurality of types of control setting items included in the operation control information.

Next, in step SP12, the processing unit 42 generates operation control information for controlling the program operation of the environment test device 2 based on the operation information acquired by the acquisition unit 41 in step SP11. That is, the processing unit 42 performs generation processing of generating the operation control information by determining the setting content of the setting screen 60 being edited based on the operation information of pressing a save button 71 described below. The operation control information includes a plurality of types of control setting items. In the example of the present embodiment, the control setting items include a temperature condition of the accommodation unit 13, a humidity condition of the accommodation unit 13, and a connection condition of the external control device 3. However, the operation control information only needs to include two or more types of control setting items, and may include control setting items other than the temperature condition, the humidity condition, and the connection condition. In place of the processing procedure of generating the operation control information after all the operations by the operator are completed (step SP12 is executed only once after step SP11), a processing procedure of sequentially reflecting the operation content in the operation control information every time the operation is performed by the operator (step SP11 and step SP12 are alternately and repeatedly executed) may be adopted.

Next, in step SP13, the output unit 43 outputs the operation control information generated in step SP12 by the processing unit 42. The operation control information output from the output unit 43 is transmitted from the data communication unit 32 to the environment test device 2 via the communication network 5. The control unit 11 controls the operations of the environment control unit 12 and the relay based on the received operation control information.

Figure 4:
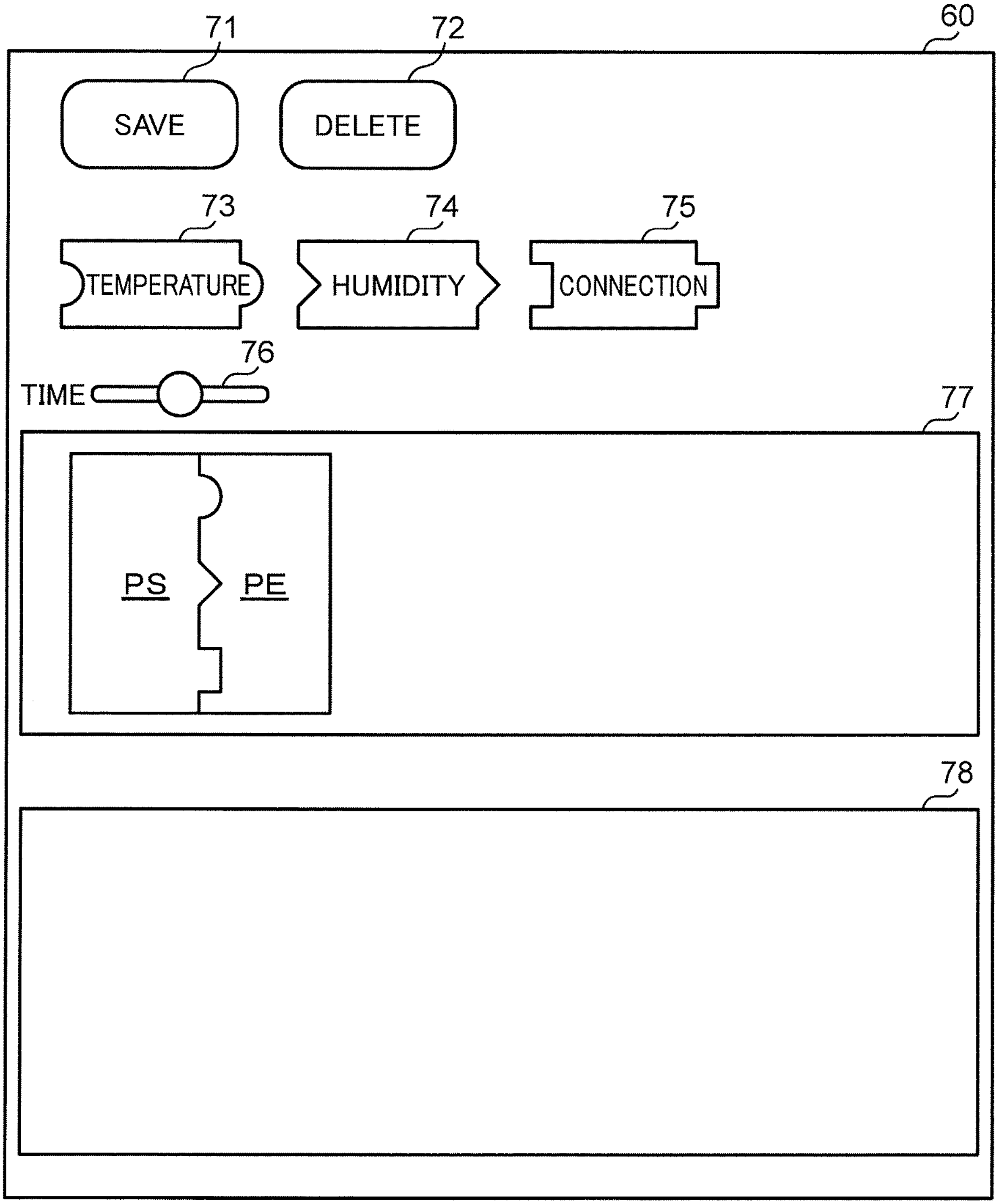
FIG. 4 is a simplified view illustrating an example of a setting screen of operation control information.

FIG. 4 is a simplified view illustrating an example of the setting screen 60 for the operation control information. Image data of the setting screen 60 is transmitted from the setting device 1 to the operation terminal 4 via the communication network 5, and the setting screen 60 is displayed on the display unit 23 of the operation terminal 4. The operator performs editing operation of the setting screen 60 by mouse operation of the input unit 21 or the like.

The save button 71 is pressed by click operation or the like when the setting content of the setting screen 60 being edited is confirmed.

A delete button 72 is pressed by click operation or the like when deleting the setting content of the setting screen 60 being edited.

The setting screen 60 includes a plurality of icons imitating the shapes of pieces of a puzzle. In the example of the present embodiment, a temperature piece 73, which is a piece figure for setting the temperature condition, a humidity piece 74, which is a piece figure for setting the humidity condition, and a connection piece 75, which is a piece figure for setting the connection condition, are included.

In a slider FIG. 76, the slider is moved and adjusted in the left-right direction on a slider bar when the scales of a time axis of a piece array display field 77 and a graph display field 78 are changed.

In the piece array display field 77, a shared piece PS and an end piece PE are displayed in an initial state before the start of editing. However, the display of the shared piece PS and the end piece PE may be omitted.

The shared piece PS is a piece figure for setting a common condition that is common to a plurality of types of control setting items, and is positioned at the head of the piece array. When the operator double-clicks or right-clicks the shared piece PS, a detail setting window regarding the shared piece PS is displayed. As the common condition, a start condition for starting a test in the environment test device 2, an alarm condition when performing a safety operation, and the like can be set.

The end piece PE is a piece figure for setting an end condition after the operation control of the environment test device 2 ends, and is positioned at the end of the piece array. When the operator double-clicks or right-clicks the end piece PE, a detail setting window regarding the end piece PE is displayed. As the end condition, for example, “power off” for interrupting the supply of drive power to the environment test device 2, “stop” for ending environment control and connection control but maintaining the supply of drive power, or “constant value operation” for switching to operation at an optionally set temperature value and humidity value can be selected.

In the graph display field 78, a graph indicating the time transition of the setting value regarding the operation control information being edited is displayed for each type of the plurality of types of control setting items. The graph display field 78 may be omitted.

The operator drags and drops the temperature piece 73, the humidity piece 74, and the connection piece 75 to desired places of the piece array display field 77 by mouth operation of the input unit 21 or the like.

Figure 5:
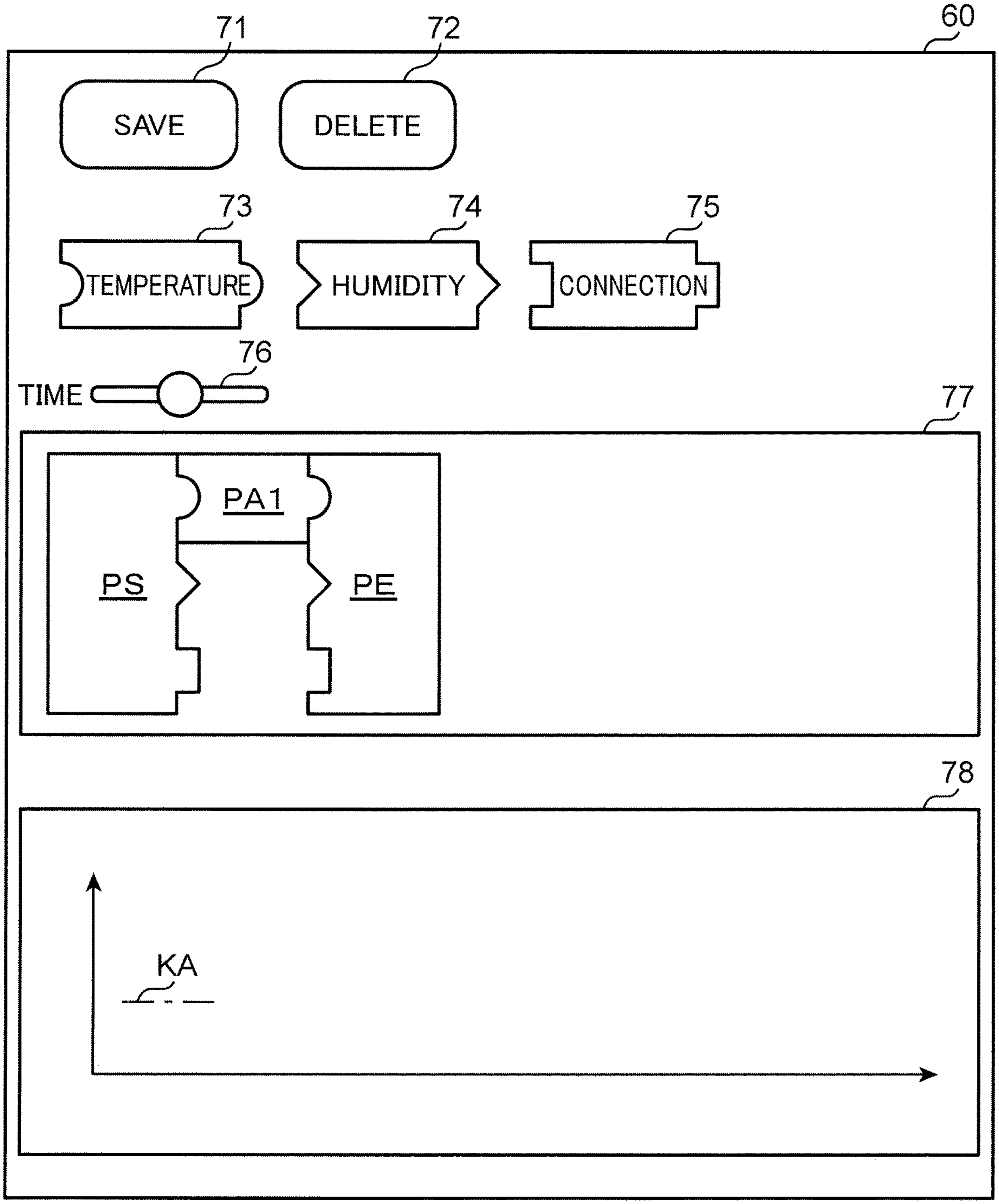
FIG. 5 is a simplified view illustrating an example of the setting screen of the operation control information.

FIG. 5 is a view illustrating a state in which one temperature piece 73 is dragged and dropped from the initial state illustrated in FIG. 4 to the piece array display field 77. The temperature piece 73 is arranged between the shared piece PS and the end piece PE as a temperature piece PA1. On each of the left and right sides of the temperature piece 73, a semicircular shape is formed as a shape of a connection portion connecting two temperature pieces 73. A semicircular shape same as that of the temperature piece 73 is also formed on each of the right side of the shared piece PS and the left side of the end piece PE. The arrangement position of the temperature piece PA1 is defined such that the semicircular shape of the temperature piece 73 is fitted into the semicircular shape of each of the shared piece PS and the end piece PE. When the operator drags and drops the temperature piece 73, the processing unit 42 highlights a region by, for example, coloring the region where the arrangement of the temperature piece 73 is permitted.

When the operator double-clicks or right-clicks the temperature piece PA1 having been arrayed, a detail setting window regarding the temperature piece PA1 is displayed. In the detail setting window, the operator can input detailed content such as a setting value of temperature, execution time of temperature control, presence or absence of temperature gradient control, a setting value of a temperature change rate, and presence or absence of exposure time control. The input may be a direct input, or may be numerical value selection or item selection by a pull-down menu, or the like. The direct input includes numerical value input by click operation using a numeric keypad displayed on the screen, or numerical value input using a keyboard or the like. When the input of detailed content is completed, the input information is transmitted from the operation terminal 4 to the setting device 1, and the processing unit 42 creates a temperature graph KA corresponding to the detailed content of the temperature piece PA1. The graph KA is displayed in the graph display field 78. The horizontal axis of the graph KA corresponds to time, and the vertical axis corresponds to the setting value. The width (dimension in the horizontal direction) of the temperature piece PA1 corresponds to the execution time of the temperature control. When the setting of the detailed content is completed, the processing unit 42 adjusts the width of the temperature piece PA1 in accordance with the setting content. The operator can change the width of the temperature piece PA1 by moving the right side of the temperature piece PA1 in the left-right direction by mouth operation of the input unit 21 or the like. The width change information is transmitted from the operation terminal 4 to the setting device 1, and based on the change information, the processing unit 42 changes the execution time of the temperature control corresponding to the temperature piece PA1 and corrects the graph KA.

Figure 6:
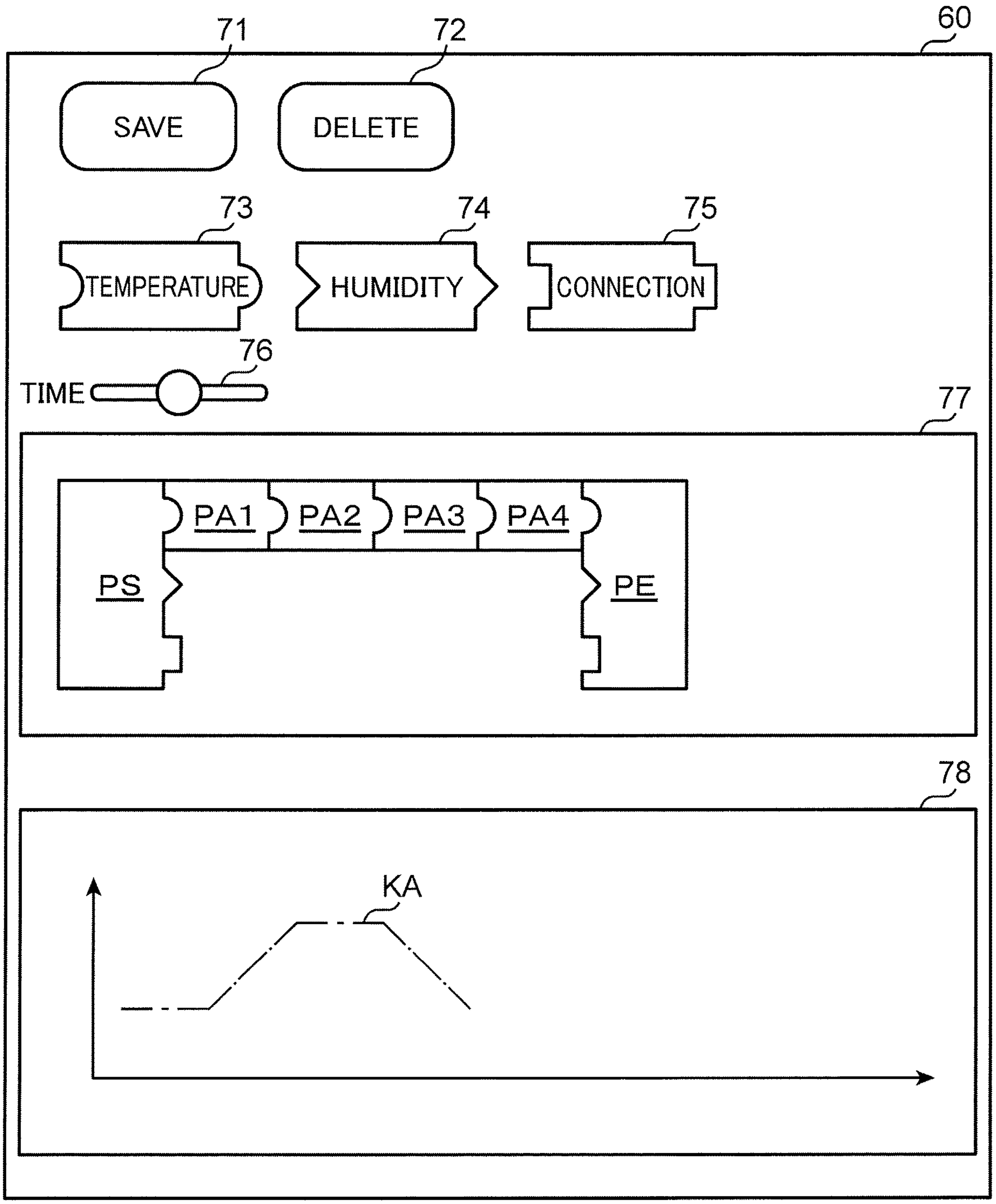
FIG. 6 is a simplified view illustrating an example of the setting screen of the operation control information.

FIG. 6 is a view illustrating a state in which three temperature pieces 73 are dragged and dropped from the state illustrated in FIG. 5 to the piece array display field 77. In the example illustrated in FIG. 6, the temperature value in a low temperature period is set by the temperature piece PA1, the temperature change rate from the low temperature period to a high temperature period is set by the temperature piece PA2, the temperature value in the high temperature period is set by the temperature piece PA3, and the temperature change rate from the high temperature period to the low temperature period is set by the temperature piece PA4. This sets control content corresponding to one cycle of the temperature cycle.

Figure 7:
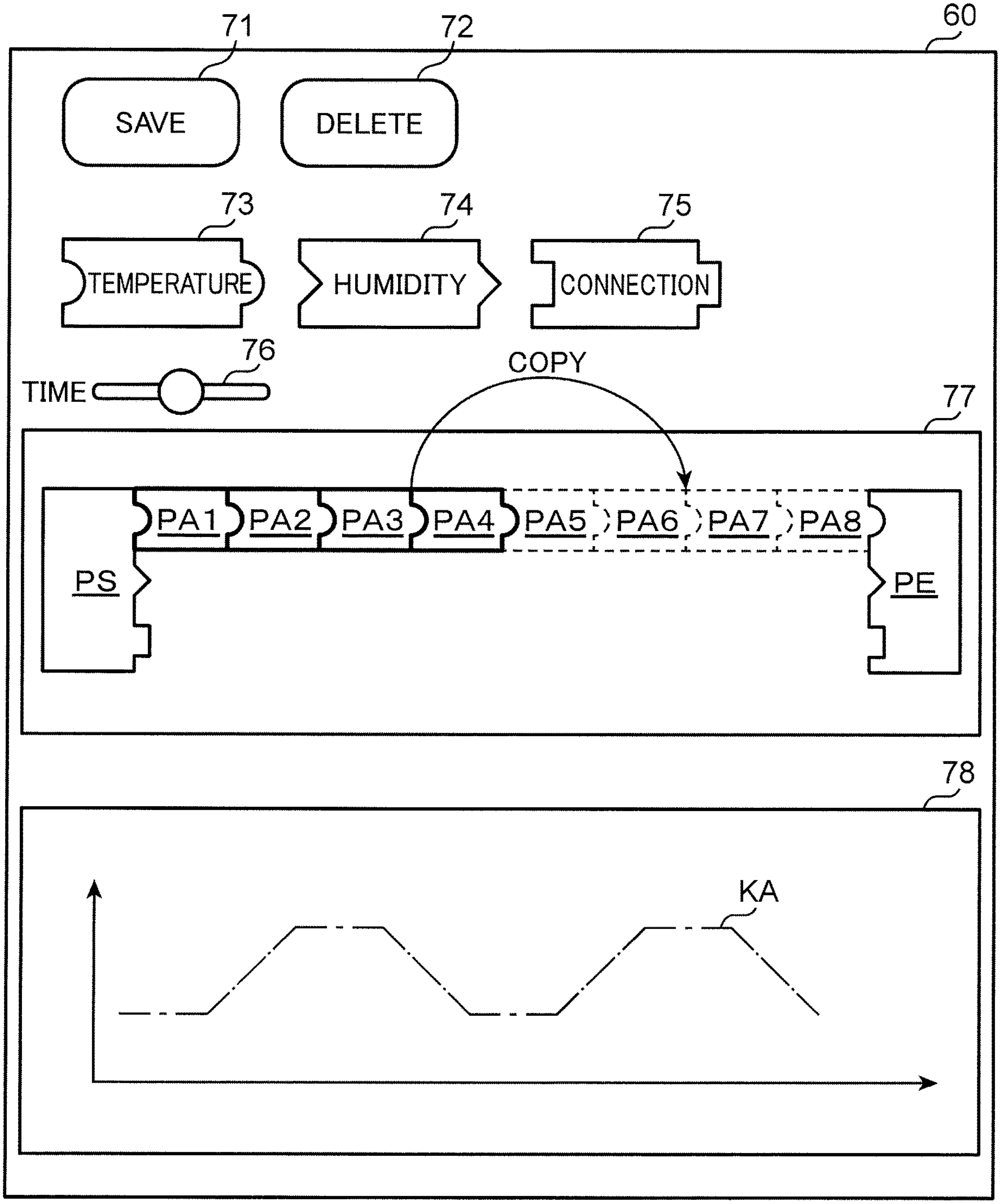
FIG. 7 is a simplified view illustrating an example of the setting screen of the operation control information.

FIG. 7 is a view illustrating a state in which the temperature pieces PA1 to PA4 are copied from the state illustrated in FIG. 6. The operator selects a temperature piece group including the temperature pieces PA1 to PA4 by mouse operation of the input unit 21 or the like, and drags and drops the temperature piece group to the copy destination place. In the example illustrated in FIG. 7, the operator drags and drops the temperature piece group to a place immediately after the temperature piece PA4. The operation information by the operator is transmitted from the operation terminal 4 to the setting device 1. The processing unit 42 executes copy processing of the temperature piece group based on the received operation information, and updates the display content of the piece array display field 77 and the graph display field 78. In the example illustrated in FIG. 7, temperature pieces PA5 to PA8 obtained by copying the temperature pieces PA1 to PA4 are additionally arranged between the temperature piece PA4 and the end piece PE. The graph KA is extended to reflect the setting content in response to the addition of the temperature pieces PA5 to PA8. The number of temperature pieces 73 to be copied is not limited to four, and only needs to be one or more. The copy operation is not limited to dragging, and may be right clicking or the like.

Figure 8:
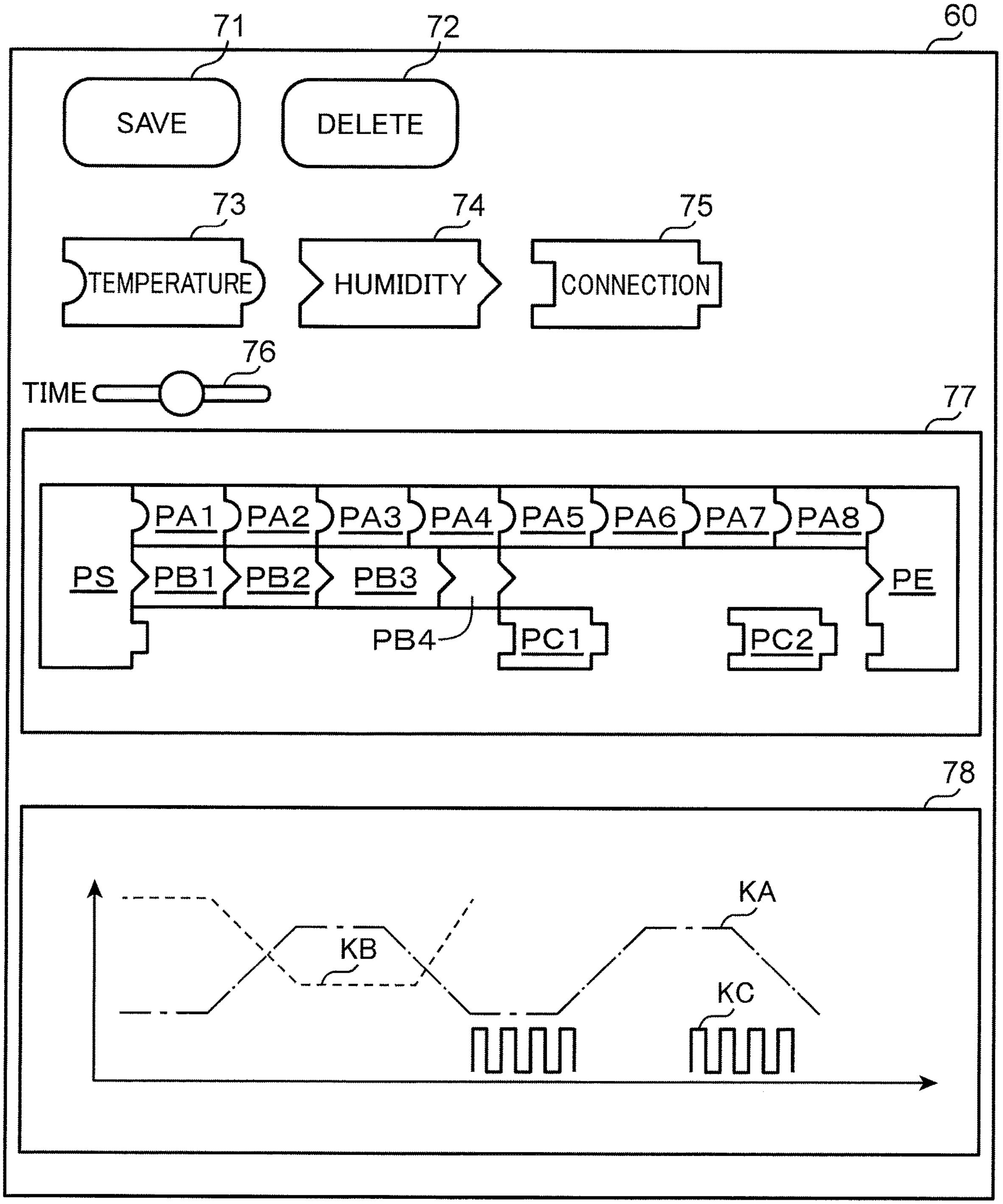
FIG. 8 is a simplified view illustrating an example of the setting screen of the operation control information.

FIG. 8 is a view illustrating a state in which four humidity pieces 74 and two connection pieces 75 are dragged and dropped in the piece array display field 77 from the state illustrated in FIG. 7.

The humidity piece 74 is arranged between the shared piece PS and the end piece PE as humidity pieces PB1 to PB4. On each of the left and right sides of the humidity piece 74, a triangular shape is formed as a shape of a connection portion connecting the two humidity pieces 74. A triangular shape same as that of the humidity piece 74 is also formed on each of the right side of the shared piece PS and the left side of the end piece PE. The arrangement positions of the humidity pieces PB1 to PB4 are defined such that the triangular shape of the humidity piece 74 is fitted into the triangular shape of each of the shared piece PS and the end piece PE. However, it is not necessary to arrange the humidity piece 74 for a period in which the humidity control is not executed, and the period may be left blank or a piece figure indicating that the humidity control is turned off may be arranged. When the operator drags and drops the humidity piece 74, the processing unit 42 highlights a region by, for example, coloring the region where the arrangement of the humidity piece 74 is permitted.

When the operator double-clicks or right-clicks the humidity pieces PB1 to PB4 having been arrayed, a detail setting window regarding the humidity pieces PB1 to PB4 is displayed. In the detail setting window, the operator can input, independently of the temperature control and the connection control, detailed content such as a setting value of humidity, execution time of humidity control, presence or absence of humidity gradient control, a setting value of a humidity change rate, and presence or absence of exposure time control. The input may be a direct input, or may be numerical value selection or item selection by a pull-down menu, or the like. The direct input includes numerical value input by click operation using a numeric keypad displayed on the screen, or numerical value input using a keyboard or the like. When the input of detailed content is completed, the input information is transmitted from the operation terminal 4 to the setting device 1, and the processing unit 42 creates a humidity graph KB corresponding to the detailed content of the humidity pieces PB1 to PB4. The graph KB is displayed in the graph display field 78. The horizontal axis of the graph KB corresponds to time, and the vertical axis corresponds to the setting value. The width (dimension in the horizontal direction) of the humidity pieces PB1 to PB4 corresponds to the execution time of the humidity control. When the setting of the detailed content is completed, the processing unit 42 adjusts the width of the humidity pieces PB1 to PB4 in accordance with the setting content. As illustrated by the humidity piece PB3 in FIG. 8, for example, one humidity piece can be arranged across a plurality of temperature pieces or a plurality of connection pieces, or the start point or the end point of the humidity piece can be arranged not to coincide with the start point or the end point of the temperature piece or the connection piece. The operator can change the width of the humidity pieces PB1 to PB4 by moving the right sides of the humidity pieces PB1 to PB4 in the left-right direction by mouth operation of the input unit 21 or the like. The width change information is transmitted from the operation terminal 4 to the setting device 1, and based on the change information, the processing unit 42 changes the execution time of the humidity control corresponding to the humidity pieces PB1 to PB4 and corrects the graph KB.

The connection piece 75 is arranged between the shared piece PS and the end piece PE as connection pieces PC1 and PC2. On each of the left and right sides of the connection piece 75, a quadrangular shape is formed as a shape of a connection portion connecting the two connection pieces 75. A quadrangular shape same as that of the connection piece 75 is also formed on each of the right side of the shared piece PS and the left side of the end piece PE. The arrangement positions of the connection pieces PC1 and PC2 are defined such that the quadrangular shape of the connection piece 75 is fitted into the quadrangular shape of each of the shared piece PS and the end piece PE. However, it is not necessary to arrange the connection piece 75 for a period in which the connection control is not executed, and the period may be left blank or a piece figure indicating that the connection control is turned off may be arranged. When the operator drags and drops the connection piece 75, the processing unit 42 highlights a region by, for example, coloring the region where the arrangement of the connection piece 75 is permitted.

Figure 9:
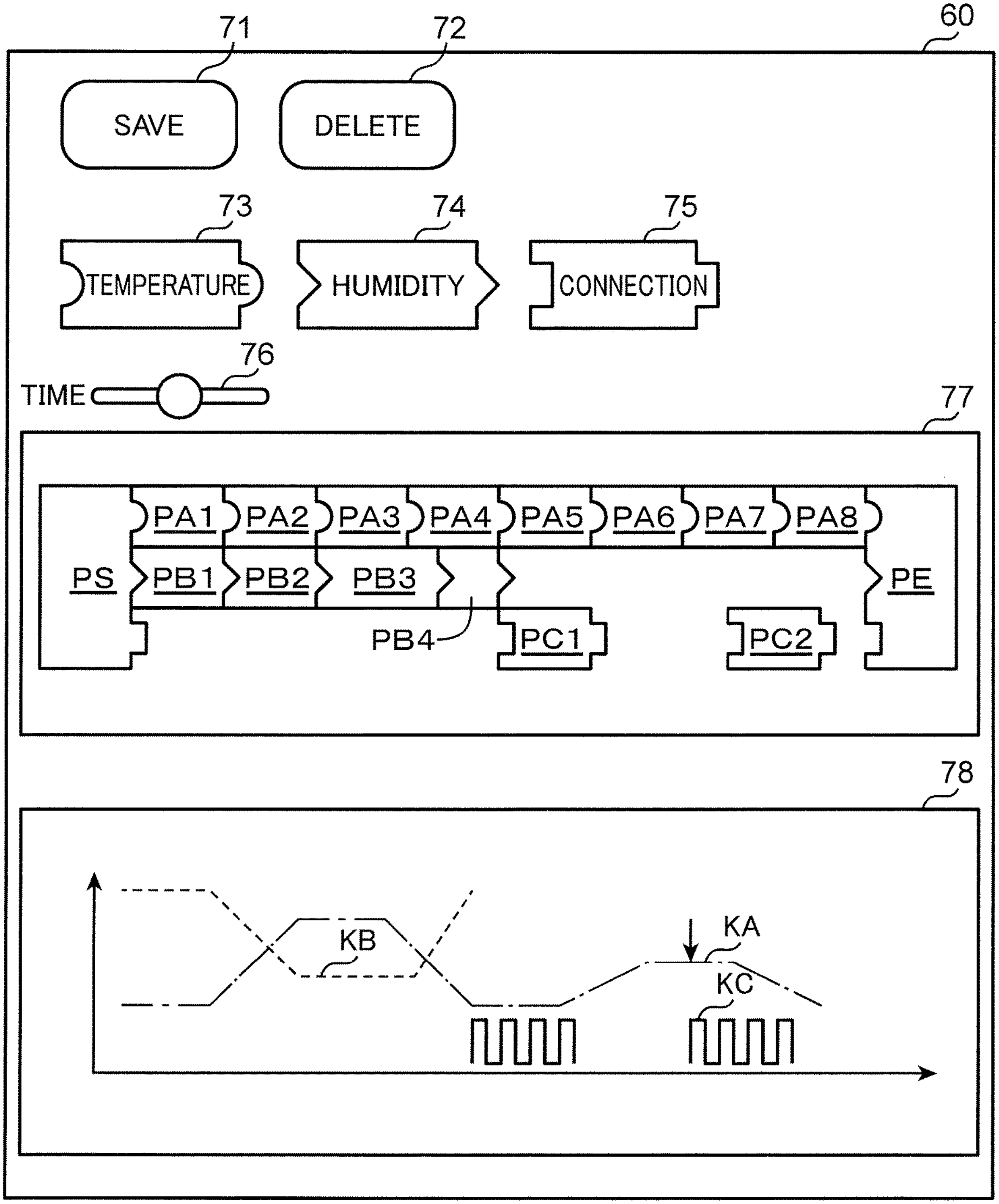
FIG. 9 is a simplified view illustrating an example of the setting screen of the operation control information.

When the operator double-clicks or right-clicks the connection pieces PC1 and PC2 having been arrayed, a detail setting window regarding the connection pieces PC1 and PC2 is displayed. In the detail setting window, the operator can input, independently of the temperature control and the humidity control, detailed content such as the on period and the off period of the relay. The input may be a direct input, or may be numerical value selection or item selection by a pull-down menu, or the like. The direct input includes numerical value input by click operation using a numeric keypad displayed on the screen, or numerical value input using a keyboard or the like. When the input of detailed content is completed, the input information is transmitted from the operation terminal 4 to the setting device 1, and the processing unit 42 creates a connection graph KC corresponding to the detailed content of the connection pieces PC1 and PC2. The graph KC is displayed in the graph display field 78. The horizontal axis of the graph KC corresponds to time, and the vertical axis corresponds to the on state or the off state of the relay. The width (dimension in the horizontal direction) of the connection pieces PC1 and PC2 corresponds to the execution time of the connection control. When the setting of the detailed content is completed, the processing unit 42 adjusts the width of the connection pieces PC1 and PC2 in accordance with the setting content. As illustrated by the connection piece PC2 in FIG. 8, for example, one connection piece can be arranged across a plurality of temperature pieces or a plurality of humidity pieces, or the start point or the end point of the connection piece can be arranged not to coincide with the start point or the end point of the temperature piece or the humidity piece. The operator can change the width of the connection pieces PC1 and PC2 by moving the right sides of the connection pieces PC1 and PC2 in the left-right direction by mouth operation of the input unit 21 or the like. The width change information is transmitted from the operation terminal 4 to the setting device 1, and based on the change information, the processing unit 42 changes the execution time of the connection control corresponding to the connection pieces PC1 and PC2 and corrects the graph KC FIG. 9 is a view illustrating a state in which change operation of the graph KA is performed from the state illustrated in FIG. 8. The operator can change the graphs KA to KC displayed in the graph display field 78 by mouse operation of the input unit 21 or the like. In the example illustrated in FIG. 9, in the period corresponding to the temperature piece PA7, the setting value of the temperature is corrected downward by dragging and dropping the change target place (line of the graph) of the graph KA. Upon completing the change operation, the change information is transmitted from the operation terminal 4 to the setting device 1, and the processing unit 42 corrects the graph KA in accordance with the change operation. The graph KA reflecting the correction content is displayed in the graph display field 78. In the example illustrated in FIG. 9, the processing unit 42 corrects the graph KA also for the periods corresponding to the temperature pieces PA6 and PA8, which are the periods before and after the period corresponding to the temperature piece PA7, associated with the change of the setting content regarding the period corresponding to the temperature piece PA7. However, this associated graph correction may be omitted. While FIG. 9 illustrates an example of the change operation for the graph KA, similar changes can be made to the graphs KB and KC. The correction of the setting content is not limited to change operation of the graph, and can be performed in, for example, a detail setting window of each of the temperature piece, the humidity piece, and the connection piece.

Figure 10:
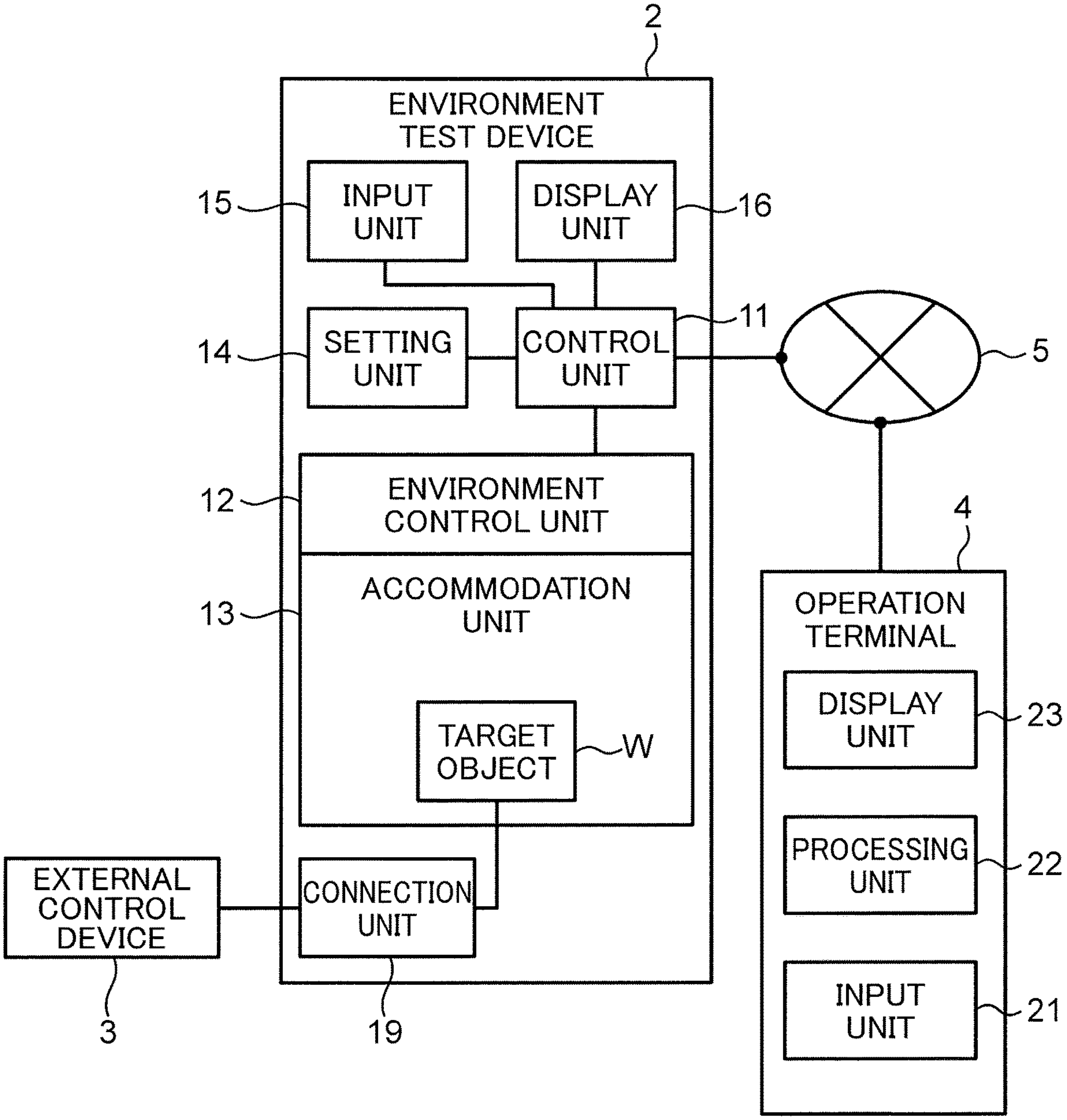
FIG. 10 is a view illustrating a configuration of an environment test device according to a first modification.

FIG. 10 is a view illustrating the configuration of an environment test device 2 according to the first modification. The function of the setting device 1 illustrated in FIG. 1 is implemented in the environment test device 2. The environment test device 2 includes a setting unit 14 having the same function as that of the setting device 1. The setting unit 14 includes the data processing unit 31, the data communication unit 32, and the data storage unit 33 same as those in FIG. 2. The data processing unit 31 includes the acquisition unit 41, the processing unit 42, and the output unit 43 same as those in FIG. 2. The data communication unit 32 is connected to the control unit 11. The data processing unit 31 may be shared with the control unit 11 or a data processing unit (not illustrated) included in the environment test device 2. The data storage unit 33 may be shared with a data storage unit (not illustrated) included in the environment test device 2.

The function of the operation terminal 4 is implemented in the environment test device 2. The environment test device 2 includes an input unit 15 and a display unit 16 same as the input unit 21 and the display unit 23 of the operation terminal 4. The input unit 15 and the display unit 16 may be shared with an input unit and a display unit (not illustrated) included in the environment test device 2. However, the implementation of the input unit 15 and the display unit 16 to the environment test device 2 may be omitted, the image data of the setting screen 60 may be transmitted from the setting unit 14 to the operation terminal 4 via the communication network 5, and the operation information may be transmitted from the operation terminal 4 to the setting unit 14 via the communication network 5. The control unit 11 may be connected to or needs not be connected to the operation terminal 4 via the communication network 5. That is, the operation terminal 4 and the communication network 5 may be omitted.

Regarding the flowchart illustrated in FIG. 3, first, in step SP11, the acquisition unit 41 included in the setting unit 14 acquires operation information by the user such as an operator on the setting screen 60 displayed on the display unit 16. The image data of the setting screen 60 is input from the setting unit 14 to the display unit 16, and the setting screen 60 is displayed on the display unit 16. The operator performs editing operation of the setting screen 60 by touchscreen operation of the input unit 15 or the like. Due to this, operation information indicating operation content by the operator is input to the input unit 15. The operation information is input from the input unit 15 to the setting unit 14. The acquisition unit 41 included in the setting unit 14 acquires the operation information input from the input unit 15.

Next, in step SP12, the processing unit 42 included in the setting unit 14 generates operation control information for controlling the program operation of the environment test device 2 based on the operation information acquired by the acquisition unit 41 in step SP11.

Next, in step SP13, the output unit 43 included in the setting unit 14 outputs the operation control information generated in step SP12 by the processing unit 42. The operation control information output from the output unit 43 is input to the control unit 11. The control unit 11 controls the operations of the environment control unit 12 and the relay based on the operation control information having been input. In place of the processing procedure of generating the operation control information after all the operations by the operator are completed (step SP12 is executed only once after step SP11), a processing procedure of sequentially reflecting the operation content in the operation control information every time the operation is performed by the operator (step SP11 and step SP12 are alternately and repeatedly executed) may be adopted.

The acquisition unit 41 included in the setting unit 14 acquires operation information by the user on the setting screen 60 of the operation control information displayed on the display unit 16. Based on the operation information acquired by the acquisition unit 41, the processing unit 42 included in the setting unit 14 performs display processing of arraying and displaying, independently for each type on the setting screen 60, a plurality of types of piece figures (the temperature piece 73, the humidity piece 74, and the connection piece 75) corresponding to a plurality of types of control setting items included in the operation control information. The processing unit 42 included in the setting unit 14 performs generation processing of generating the operation control information based on the arrayed information. The output unit 43 included in the setting unit 14 outputs the operation control information generated by the processing unit 42. The control unit 11 controls the operations of the environment control unit 12 and the relay based on the operation control information input from the output unit 43.

Figure 11:
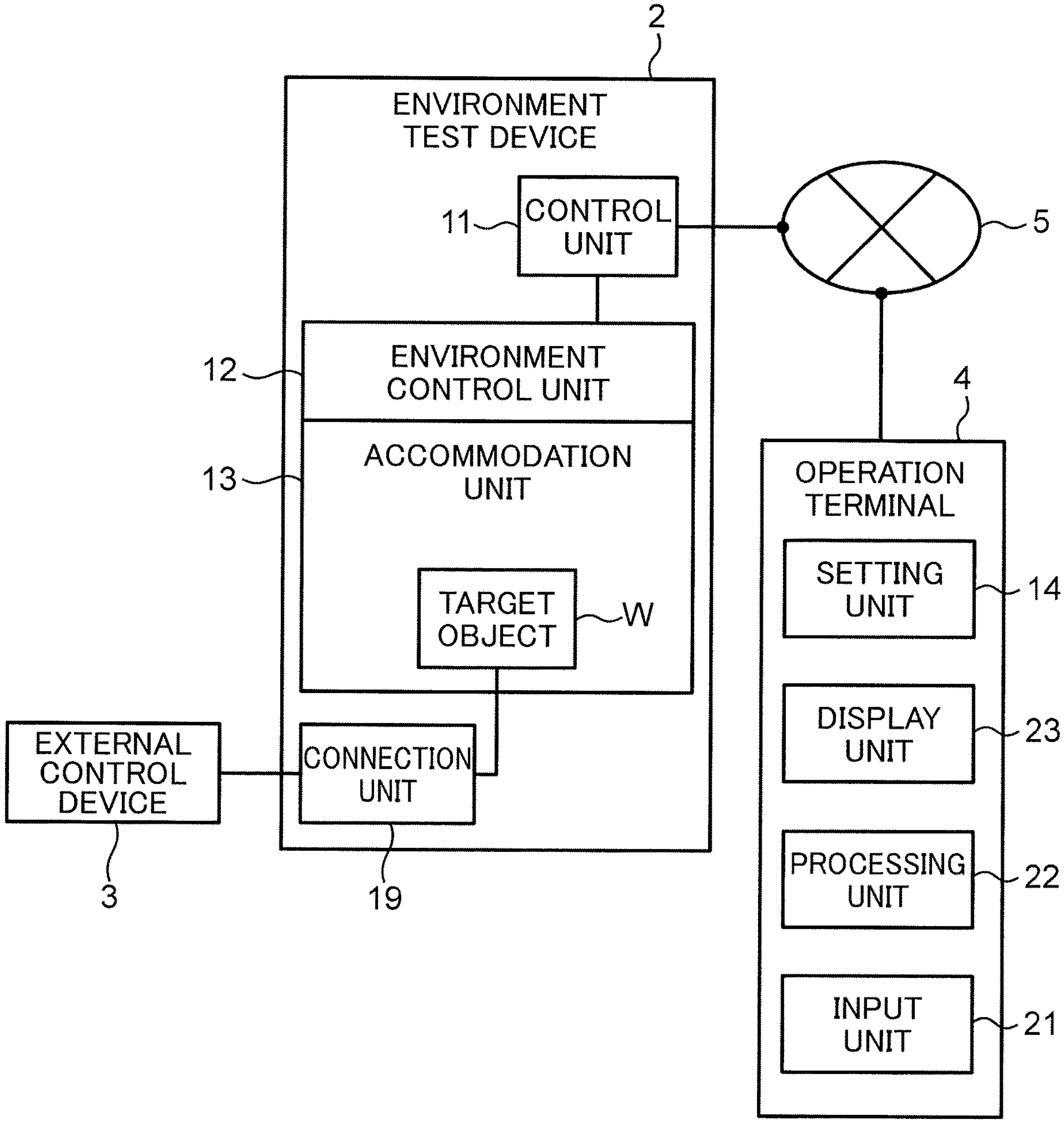
FIG. 11 is a view illustrating a configuration of an environment test device according to a second modification.

FIG. 11 is a view illustrating the configuration of an environment test device 2 according to the second modification. The function of the setting device 1 illustrated in FIG. 1 is implemented in the operation terminal 4. The operation terminal 4 includes the setting unit 14 having the same function as that of the setting device 1. The setting unit 14 includes the data processing unit 31, the data communication unit 32, and the data storage unit 33 same as those in FIG. 2. The data processing unit 31 includes the acquisition unit 41, the processing unit 42, and the output unit 43 same as those in FIG. 2. The data processing unit 31 may be shared with the processing unit 22 included in the operation terminal 4. The data storage unit 33 may be shared with a data storage unit (not illustrated) included in the operation terminal 4. The acquisition unit 41 included in the setting unit 14 acquires operation information by the user on the setting screen 60 of the operation control information displayed on the display unit 23. Based on the operation information acquired by the acquisition unit 41, the processing unit 42 included in the setting unit 14 performs display processing of arraying and displaying, independently for each type on the setting screen 60, a plurality of types of piece figures (the temperature piece 73, the humidity piece 74, and the connection piece 75) corresponding to a plurality of types of control setting items included in the operation control information. The processing unit 42 included in the setting unit 14 performs generation processing of generating the operation control information based on the arrayed information. The output unit 43 included in the setting unit 14 outputs the operation control information generated by the processing unit 42. The operation terminal 4 transmits the operation control information output from the output unit 43 to the environment test device 2 via the communication network 5. The control unit 11 controls the operation of the environment control unit 12 and the relay based on the operation control information received from the operation terminal 4. Similarly to the above embodiment, a configuration may be adopted in which the processing procedure of generating the operation control information after all the operation by the operator are completed (step SP12 is executed only once after step SP11 in FIG. 3) is performed, and in place of this, a configuration may be adopted in which a processing procedure of sequentially reflecting the operation content in the operation control information every time the operation is performed by the operator (step SP11 and step SP12 in FIG. 3 are alternately and repeatedly executed) is performed. In place of connecting the operation terminal 4 to the communication network 5, the operation control information generated by the setting unit 14 included in the operation terminal 4 may be stored in a storage medium such as a USB memory, and the control unit 11 may read the operation control information from the storage medium.

In the above embodiment, an example in which the temperature piece, the humidity piece, and the connection piece have different shapes from one another has been described, but instead of making the shapes different, the temperature piece, the humidity piece, and the connection piece may be made visually distinguishable by, for example, making the color of the entire piece figure or the color of the frame different. This makes it possible to regulate the arrangement position of the piece figures so as to allow connection between the same type of piece figures and prohibit connection between different types of piece figures, and as a result, it is possible to avoid, in advance, erroneous setting caused by erroneous operation by the operator.

According to the present embodiment, based on the operation information acquired by the acquisition unit 41, the processing unit 42 performs display processing of arraying and displaying, independently for each type on the setting screen 60, a plurality of types of piece figures corresponding to a plurality of types of control setting items included in the operation control information, and generation processing of generating the operation control information based on the arrayed information. Therefore, complicated work of finely dividing and setting the test step when changing only the setting value of one control setting item becomes unnecessary, and therefore the efficiency of data input work by the operator can be improved.

According to the present embodiment, since the width of the arrayed piece figure indicates the execution time of the control, the operator can visually and easily grasp the execution time of the control.

According to the present embodiment, the operator can easily change the execution time of the control by changing the width of the piece figure.

According to the present embodiment, since the shape of the connection portion between the piece figures differs depending on the type of the control setting item, the operator cannot connect piece figures of different types, and therefore it is possible to avoid erroneous setting in advance.

According to the present embodiment, the end point of the operation control can be visually made clear by the end piece PE at the end of the array, and the operator can optionally set the end condition in the end piece PE.

According to the present embodiment, the operator can easily perform repetition setting by selection and copy processing of the piece figure group.

According to the present embodiment, the operator can visually and easily grasp the time transition of the setting value of the control setting item by the graphs KA to KC.

According to the present embodiment, the operator can easily change the setting value of the control setting item by change operation of the graphs KA to KC.

A setting device according to one aspect of the present invention is a setting device that sets operation control information for controlling operation of an environment forming device, the setting device including: an acquisition unit that acquires operation information by a user regarding setting of the operation control information; a processing unit that performs processing of arraying and displaying, independently for each type on a setting screen, a plurality of types of setting parts corresponding to a plurality of types of control setting items included in the operation control information based on the operation information acquired by the acquisition unit, and processing of generating the operation control information based on the arrayed information; and an output unit that outputs the operation control information generated by the processing unit.

According to the present aspect, the processing unit arrays and displays, independently for each type on a setting screen, a plurality of types of setting parts corresponding to a plurality of types of control setting items included in the operation control information based on the operation information acquired by the acquisition unit, and generates the operation control information based on the arrayed information. Therefore, complicated work of finely dividing and setting the test step when changing only the setting value of one control setting item becomes unnecessary, and therefore the efficiency of data input work by the operator can be improved.

In the above aspect, a width of the setting parts having been arrayed indicates execution time of control corresponding to the setting parts.

According to the present aspect, since the width of the arrayed setting parts indicates the execution time of the control, the operator can visually and easily grasp the execution time of the control.

In the above aspect, the processing unit is capable of changing a width of the setting parts having been arrayed, based on the operation information acquired by the acquisition unit.

According to the present aspect, the operator can easily change the execution time of the control.

In the above aspect, a shape of a connection portion connecting two setting parts is different for each type of the plurality of types of control setting items.

According to the present aspect, since the operator cannot connect setting parts of different types, it is possible to avoid erroneous setting in advance.

In the above aspect, the processing unit is capable of setting an end condition after operation control of the environment forming device ends in a setting part at an end of an array of a plurality of setting parts based on the operation information acquired by the acquisition unit.

According to the present aspect, the end point of the operation control can be visually made clear, and the operator can optionally set the end condition in the setting part at the end.

In the above aspect, the processing unit is capable of performing copy processing of a setting parts group including at least one setting part based on the operation information acquired by the acquisition unit.

According to the present aspect, the operator can easily perform repetition setting.

In the above aspect, the processing unit performs processing of creating a graph indicating time transition of a setting value for each type of the plurality of types of control setting items.

According to the present aspect, the operator can visually and easily grasp the time transition of the setting value of the control setting item by displaying the created graph.

In the above aspect, the processing unit is capable of changing the setting value based on change operation information of the graph acquired by the acquisition unit.

According to the present aspect, the operator can easily change the setting value of the control setting item by change operation of the graph.

An environment forming device according to one aspect of the present invention includes: an accommodation unit that accommodates a target object; and an environment control unit that controls an environment in the accommodation unit, in which the environment control unit is controlled based on operation control information input from the setting device according to the aspect described above.

According to the present aspect, complicated work of finely dividing and setting the test step when changing only the setting value of one control setting item becomes unnecessary, and therefore the efficiency of data input work by the operator can be improved.

A computer-readable recording medium that records a program according to one aspect of the present invention is a computer-readable recording medium that records a program, the program causing a processor mounted in a setting device that sets operation control information for controlling operation of an environment forming device to execute an acquisition step of acquiring operation information by a user regarding setting of the operation control information, a processing step of arraying and displaying, independently for each type on a setting screen, a plurality of types of setting parts corresponding to a plurality of types of control setting items included in the operation control information based on the operation information acquired in the acquisition step, and generating the operation control information based on the arrayed information, and an output step of outputting the operation control information generated in the processing step.

According to the present aspect, the processing step is a step of arraying and displaying, independently for each type on a setting screen, a plurality of types of setting parts corresponding to a plurality of types of control setting items included in the operation control information based on the operation information acquired in the acquisition step, and generating the operation control information based on the arrayed information. Therefore, complicated work of finely dividing and setting the test step when changing only the setting value of one control setting item becomes unnecessary, and therefore the efficiency of data input work by the operator can be improved.

An environment forming device according to one aspect of the present invention is an environment forming device including: an accommodation unit that accommodates a target object; an environment control unit that controls an environment in the accommodation unit; a display unit; and a setting unit that sets operation control information for controlling operation of the environment forming device, in which the setting unit includes an acquisition unit that acquires operation information by a user regarding setting of the operation control information, a processing unit that performs processing of arraying and displaying, independently for each type on a setting screen, a plurality of types of setting parts corresponding to a plurality of types of control setting items included in the operation control information based on the operation information acquired by the acquisition unit, and processing of generating the operation control information based on the arrayed information, and an output unit that outputs the operation control information generated by the processing unit.

According to the present aspect, the processing unit arrays and displays, independently for each type on a setting screen, a plurality of types of setting parts corresponding to a plurality of types of control setting items included in the operation control information based on the operation information acquired by the acquisition unit, and generates the operation control information based on the arrayed information. Therefore, complicated work of finely dividing and setting the test step when changing only the setting value of one control setting item becomes unnecessary, and therefore the efficiency of data input work by the operator can be improved.

A setting method according to one aspect of the present invention is a setting method for setting operation control information for controlling operation of an environment forming device, in which an information processing device acquires operation information by a user regarding setting of the operation control information, arrays and displays, independently for each type on a setting screen, a plurality of types of setting parts corresponding to a plurality of types of control setting items included in the operation control information based on the operation information having been acquired, and generates the operation control information based on the arrayed information, and outputs the operation control information having been generated.

According to the present aspect, the information processing device arrays and displays, independently for each type on a setting screen, a plurality of types of setting parts corresponding to a plurality of types of control setting items included in the operation control information based on the operation information having been acquired, and generates the operation control information based on the arrayed information. Therefore, complicated work of finely dividing and setting the test step when changing only the setting value of one control setting item becomes unnecessary, and therefore the efficiency of data input work by the operator can be improved.

This application is based on Japanese Patent application No. 2022-048706 filed in Japan Patent Office on Mar. 24, 2022 the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A setting device that sets operation control information for controlling operation of an environment forming device, the setting device comprising:

an acquisition unit that acquires operation information by a user regarding setting of the operation control information;

a processing unit that performs processing of arraying and displaying, independently for each type on a setting screen, a plurality of types of setting parts corresponding to a plurality of types of control setting items included in the operation control information based on the operation information acquired by the acquisition unit, and processing of generating the operation control information based on the arrayed information; and an output unit that outputs the operation control information generated by the processing unit, wherein the plurality of types of control setting items include temperature condition and humidity condition, the plurality of types of setting parts, arraying and displaying independently for each type on the setting screen, include a temperature setting parts array comprising a plurality of setting parts related to temperature condition connected together, and a humidity setting parts array comprising a plurality of setting parts related to humidity conditions connected together, and the environment forming device is controlled in operation based on the operation control information output from the output unit.

2. The setting device according to claim 1, wherein a width of the setting parts having been arrayed indicates execution time of control corresponding to the setting parts.

3. The setting device according to claim 2, wherein the processing unit is capable of changing a width of the setting parts having been arrayed, based on the operation information acquired by the acquisition unit.

4. The setting device according to claim 1, wherein a shape of a connection portion connecting two setting parts is different for each type of the plurality of types of control setting items.

5. The setting device according to claim 1, wherein the processing unit is capable of setting an end condition after operation control of the environment forming device ends in a setting part at an end of an array of a plurality of setting parts based on the operation information acquired by the acquisition unit.

6. The setting device according to claim 1, wherein the processing unit is capable of performing copy processing of a setting parts group including at least one setting part based on the operation information acquired by the acquisition unit.

7. The setting device according to claim 1, wherein the processing unit performs processing of creating a graph indicating time transition of a setting value for each type of the plurality of types of control setting items.

8. The setting device according to claim 7, wherein the processing unit is capable of changing the setting value based on change operation information of the graph acquired by the acquisition unit.

9. An environment forming device comprising:

an accommodation unit that accommodates a target object; and an environment control unit that controls an environment in the accommodation unit, wherein the environment control unit is controlled based on operation control information input from the setting device according to claim 1.

10. A computer-readable non-transitory recording medium that records a program, the program causing a processor mounted in a setting device that sets operation control information for controlling operation of an environment forming device to execute an acquisition step of acquiring operation information by a user regarding setting of the operation control information, a processing step of arraying and displaying, independently for each type on a setting screen, a plurality of types of setting parts corresponding to a plurality of types of control setting items included in the operation control information based on the operation information acquired in the acquisition step, and generating the operation control information based on the arrayed information, and an output step of outputting the operation control information generated in the processing step, wherein the plurality of types of control setting items include temperature condition and humidity condition, the plurality of types of setting parts, arraying and displaying independently for each type on the setting screen, include a temperature setting parts array comprising a plurality of setting parts related to temperature condition connected together, and a humidity setting parts array comprising a plurality of setting parts related to humidity conditions connected together, and the environment forming device is controlled in operation based on the operation control information output by the output step.

11. An environment forming device comprising:

an accommodation unit that accommodates a target object;

an environment control unit that controls an environment in the accommodation unit;

a display unit; and a setting unit that sets operation control information for controlling operation of the environment forming device, wherein the setting unit includes an acquisition unit that acquires operation information by a user regarding setting of the operation control information, a processing unit that performs processing of arraying and displaying, independently for each type on a setting screen, a plurality of types of setting parts corresponding to a plurality of types of control setting items included in the operation control information based on the operation information acquired by the acquisition unit, and processing of generating the operation control information based on the arrayed information, and an output unit that outputs the operation control information generated by the processing unit, wherein the plurality of types of control setting items include temperature condition and humidity condition, the plurality of types of setting parts, arraying and displaying independently for each type on the setting screen, include a temperature setting parts array comprising a plurality of setting parts related to temperature condition connected together, and a humidity setting parts array comprising a plurality of setting parts related to humidity conditions connected together, and the environment forming device is controlled in operation based on the operation control information output from the output unit.

12. A setting method for setting operation control information for controlling operation of an environment forming device, wherein an information processing device acquires operation information by a user regarding setting of the operation control information, arrays and displays, independently for each type on a setting screen, a plurality of types of setting parts corresponding to a plurality of types of control setting items included in the operation control information based on the operation information having been acquired, and generates the operation control information based on the arrayed information, and outputs the operation control information having been generated, wherein the plurality of types of control setting items include temperature condition and humidity condition, the plurality of types of setting parts, arraying and displaying independently for each type on the setting screen, include a temperature setting parts array comprising a plurality of setting parts related to temperature condition connected together, and a humidity setting parts array comprising a plurality of setting parts related to humidity conditions connected together, and the environment forming device is controlled in operation based on the operation control information.

* * * * *